United States Patent Office 2,985,677
Patented May 23, 1961

2,985,677
SILICONE FLUIDS

Gordon C. Gainer, Pittsburgh, Pa., assignor to Westinghouse Electric Corporation, East Pittsburgh, Pa., a corporation of Pennsylvania No Drawing. Filed May 14, 1954, Ser. No. 429,979

5 Claims. (Cl. 260—448.2)

This invention relates to a novel silicone fluid suitable for use as a lubricant and to the method of lubricating moving parts therewith.

Organosiloxane fluids comprising dimethyl silicones have been disclosed heretofore, and it has been suggested, as in Ford and Wenzel Patent 2,456,496, that they be employed as lubricants because of their remarkably small change in viscosity with the change in temperature, as compared to other known lubricant materials. However, the dimethyl silicones have been found to be somewhat deficient in certain required lubricating properties. Thus, the dimethyl silicones have poor film strength where ferrous metal surfaces are involved—particularly under boundary lubricating conditions—and, in many bearing structures, excessive wear and a high coefficient of friction are encountered. Consequently, the dimethyl silicones are suitable for use as lubricants only in a limited range of applications and usually under light loads.

The coefficient of friction of a commercially available dimethyl silicone lubricating fluid, representing about the best dimethyl silicone liquid available at the present time, is approximately 0.36, steel vs. steel. When tested in a Falex machine, the dimethyl silicone oils give an average wear rate, steel on steel, of 3600 wear units per hour. By contrast, high-grade petroleum machine lubricants have coefficients of friction of from 0.13 to 0.20 under the same test conditions, while the average wear rate in the Falex machine is from 2 to 8, or slightly more, units per hour. It will be apparent, therefore, that in these properties at least the dimethyl silicones are not as satisfactory as the petroleum lubricants. In actual service, the dimethyl silicone lubricants are severely limited as to useful applications because of such deficiency in properties.

While it has been proposed, as set forth in application Serial No. 151,821, filed March 24, 1950, now abandoned, of which I am one of the co-inventors, that siloxane lubricating fluids may be prepared wherein substituted phenyl groups are attached to the silicon atoms along the siloxane chain in order to provide for a low coefficient of friction and a low wear rate, these siloxane lubricants generally have a freezing point of not lower than −40° F., and often approaching 0° C. As a consequence, they are not suitable for use at extremely low temperatures, such as are met with in aircraft operations using jet engines. In the operation of aircraft jet engines, in particular, the temperatures that are commonly encountered are −65° F. and lower. Practically every known lubricant suitable for this application becomes extremely viscous or even solid at such low temperatures. While efforts have been made to prepare lubricants that are reasonably fluid at temperatures of −65° F., it has been found that the lubricants are subjected to extremely high temperatures during operation and particularly when the aircraft lands and the jet engine ceases operating. This is due to the heat soaking back to the main bearings along the shaft from the hot turbine rotor. When this occurs the intensely heated parts of the turbine rotor conduct heat rapidly to the bearings and subject the lubricant therein to "frying" for considerable periods of time inasmuch as there are no means for otherwise cooling them or for dissipating the heat. Such frying temperature in the bearing reaches at least 400° F. and higher, and causes serious decomposition of every known organic lubricant. Therefore gums and sludge form on the bearing surfaces and in the body of the lubricant. Consequently, the present requirements for a satisfactory lubricant for jet engines are that it be reasonably fluid at −65° F. and that it must withstand this frying action which follows at the termination of every flight. It has been impossible heretofore to produce a lubricant that would satisfactorily withstand these temperature extremes for any substantial period of time.

The term "silicone" as used herein designates essentially linear or unbranched siloxanes having repeating

groups and terminal silhemioxane

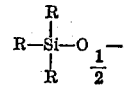

groups, wherein R represents organic groups, such as hydrocarbons and halosubstituted hydrocarbon groups.

The object of this invention is to provide a novel dimethyl silicone fluid with an electronegative substituted phenyl radical attached only to the terminal silicon atoms, such fluid flows readily at temperatures below −65° F., has good anti-friction properties, and will withstand temperatures of the order of 400° F. and higher for substantial periods without being decomposed or otherwise adversely affected.

A further object of the invention is to prepare novel linear dimethyl silicones terminated with trisubstituted silhemioxane groups where the substituents comprise two methyl radicals and a single electro-negative substituted phenyl radical attached to silicon.

Another object of the invention is to provide a method for satisfactorily lubricating members over a wide range of temperatures reaching as low as −65° F. at one extreme and 400° F. at the other extreme by applying thereto a linear dimethyl silicone oil having end-blocking trisubstituted silhemioxane groups containing two methyl radicals and a single electronegative substituted phenyl radicals attached to the silicon.

Other objects of the invention will in part be obvious and will in part appear hereinafter.

I have discovered that a silicone lubricating fluid is suitable for use in bearings, gears and transmissions, and the like, and in hydraulic fluid apparatus of varying types, which has a satisfactorily low coefficient of friction and which will effectively lubricate steel against steel, may be prepared by terminating a linear dimethyl silicone chain with an end blocking group comprising a trisubstituted silhemioxane radical wherein the substituents are two methyl groups and an electronegatively substituted phenyl radical. The structural formula for such fluids is as follows:

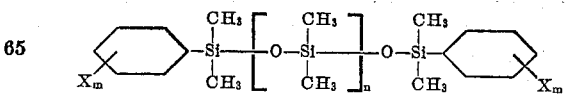

where $n$ is at least 1, X represents at least one of the group consisting of chlorine, bromine, fluorine, and trifluoromethyl, and $m$ has a value of from 1 to 4. The best results are secured when $n$ has a value of from 3 to 6. I have found that such silicone fluids are quite liquid at temperatures well below −65° F. and in, fact, in cases do not freeze at temperatures of as low as −104° F. Further, the fluids have high resistance to oxidative and thermal degradation, whereby they will withstand temperatures as high as 500° F. or higher or prolonged periods of time without serious decomposition. Their viscosity temperature coefficients are excellent. They are excellent bearing lubricants with low coefficients of friction throughout the entire range of temperatures in which they may be reasonably employed as in jet engines, refrigerating machines, and other demanding lubricating applications.

In preparing the fluid silicone lubricants of this invention, a number of different procedures may be followed. Consistently good results have been secured by equilibrating a cyclic dimethyl siloxane having a desired average closed chain length, with a disiloxane having the following structural formula:

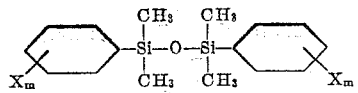

wherein X and $m$ have the meaning given previously. The equilibration may take place in the presence of sulphuric acid or other equilibrating medium. The resulting product may be freed from the sulphuric acid, or other equilibrating agent, and any undesired or unrequired compounds may be readily separated by fractional distillation, stripping under vacuum, or other means.

Another procedure used in preparing the novel fluid silicones of the present invention is to combine a chain propagating dimethylsilane having two hydrolyzable groups with a certain propotion of a chain terminating silane containing two methyl radicals and one electronegative substituted-phenyl radical and having a single hydrolyzable group, and to subject the mixture to hydrolysis and condensation whereby there is produced an end blocked siloxane fluid. In this last process, there will be produced a mixture of molecules of different lengths, the average length depending, of course, on the proportions of the silanes to one another. If desired, the mixture may be subject to fractional distillation or to vacuum stripping to isolate fractions of different viscosity. As is well known to those working in the art, each chain will contain two end blocking trisubstituted silhemioxane groups containing two methyl radicals and an electronegative substituted pheny radical with the intermediate portions of the chains comprising dimethyl siloxane groups. The following examples illustrate the practice of the invention:

EXAMPLE I

There were admixed 4128 grams (32 mols) of dimethyldichlorosilane and 3832 grams (16 mols) of x,x-dichlorophenyldimethylchlorosilane. The mixture was hydrolyzed by addition with stirring to a large excess of crushed ice, the temperature being maintained below 15° C. Aqueous hydrochloric acid formed by hydrolysis was decanted from the viscous mass a number of times during the hydrolysis. Fresh ice and water were added from time to time to minimize the formation of strong hydrochloric acid solutions. After the hydrolysis was complete, the mixture was allowed to reach room temperature gradually and was vigorously agitated for 16 hours. At the end of this time, the mixture was permitted to stand, and it separated into a very fluid silicone layer and an aqueous acidic layer. The silicone fluid was separated from the aqueous layer, washed with water to neutrality, and then dried over anhydrous sodium sulfate. This resulted in 4830 milliliters of dry silicone fluid. The dry fluid was then chilled to about 10° C. and 241.5 milliliters of concentrated (100%) sulfuric acid was added thereto drop-wise, with stirring. The mixture was stirred for 42 hours at room temperature. The equilibrated mixture was then poured onto a large excess of crushed ice. After thorough mixing, the silicone fluid layer was permitted to separate and was decanted, after which it was washed to neutrality with sodium carbonate solution. The equilibrated silicone fluid was then dried and stripped for two hours at 210° C. in a Claisen distillation apparatus equipped for sparging with dry nitrogen passed thereinto through a capillary tube, under a vacuum of 1 to 2 mm. of mercury to remove volatile components.

The resulting silicone fluid was formulated to have the following average structural configuration:

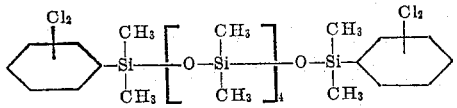

Analysis for chlorine gave 19.70 and 19.82% whereas calculated chlorine is 19.75%. For this reason it was established that the product had the structure indicated in the formula. Determination of the viscosity of this silicone fluid at several temperatures gave the following values:

Table I

| Temperature, °F.: | Viscosity, centistokes |
|---|---|
| 210 | 4.3 |
| 100 | 15.4 |
| −65 | 43,000 |

The viscosity temperature coefficient was 0.72. The freezing point of this fluid was about −90° F.

The coefficient of friction of the fluid silicone of the Example I was 0.18. When tested in a Shell four ball E.P. test for steel vs. steel, the following data were obtained:

Table II

| Applied load, (kg.): | Average scar dia. (mm.) |
|---|---|
| 20 | 0.28 |
| 30 | 0.51 |
| 40 | 0.55 |
| 50 | 0.64 |
| 60 | 0.85 |
| 70 | 0.83 |
| 80 | 0.83 |
| 90 | 0.86 |
| 100 | 0.92 |
| 110 | 0.93 |
| 120 | Weld |

One of the best petroleum base turbojet oils in use at the present time has a weld point of 90 kg. in this test. Consequently, the present lubricant is superior in this respect to the petroleum lubricant.

A number of structurally similar silicone fluids of different average molecular weights were produced following the procedure of Example I using, however, a different mol ratio of the dimethyldichlorosilane to the dichlorophenyldimethylchlorosilane. The following table indicates the properties of these respective silicone fluids, wherein the term "Ratio" refers to the ratio of the mols of dimethyldichlorosilane to mols of the dichlorophenyldimethylchlorosilane:

Table III

| Ratio | Chlorine Cont., Percent | | Viscosity | | | VTC | Freezing Point |
|---|---|---|---|---|---|---|---|
| | Calcd. | Found | −65° F. | 100° F. | 210° F. | | |
| A | 9:2 | 13.7 | 13.63 | | 19.0 | 6.7 | 0.65 | Below −104° F. |
| B | 6:2 | 16.4 | 17.0 | 5,600 | 20.04 | 5.61 | 0.72 | Below −104° F. |
| C | 5:2 | 17.8 | 18.2 | | 16.3 | 4.9 | 0.70 | −94 to −99° F. |

The coefficient of friction of these oils was from 0.13 to 0.18, steel on steel, and the Shell four ball tests gave values similar to those in Table II. The lubricants A, B and C each comprised a mixture of molecules of different chain length. Thus in lubricant A the average molecule contained 9 dimethyl siloxane units and two terminal trisubstituted silhemioxane groups, the substituents being two methyl radical and one dichlorophenyl radical.

EXAMPLE II

Metatrifluoromethylphenyldimethylchlorosilane is substituted in equal mol proportions for the dichlorophenylmethyldichlorosilane of Example I. The procedure of Example I is otherwise followed. There is produced a fluid silicone having essentially the following average structural formula:

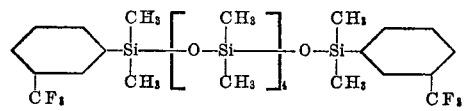

This oil is fluid at temperatures well below —65° F.

In preparing substituted phenyl siloxanes having 3, 4 or 5 groups thereon, the following procedure has been found to be suitable. The compound phenyltrichlorosilane, which is readily available, is dissolved in carbon tetrachloride for example, and is chlorinated in the presence of an iron catalyst by passing chlorine gas therethrough over a period of several hours. In one particular instance, I chlorinated the phenyl group to introduce an average of 3.5 chlorine atoms per phenyl group. Thereafter, the chlorophenyltrichlorosilane is methylated with a methylmagnesium chloride Grignard reagent to replace two of the chlorine groups attached to silicon with methyl groups. The resulting product is then fractionally distilled to produce substantially pure polychlorophenyldimethylchlorosilane wherein the phenyl groups have an average of 3.5 chlorine atoms attached thereto. The resulting product is substituted for the dichlorophenyldimethylchlorosilane of Example I. A fluid silicone having a freezing point of well below —65° F. results.

EXAMPLE III

Two moles of 4-chloro-3-(trifluoromethyl)phenylmagnesium bromide are added with stirring and cooling (by use of an ice bath) to an ether solution of 3 moles of dimethyl diethoxysilane. After the addition is completed, the reaction mixture is stirred for three hours and then distilled. Ether and unreacted dimethyldiethoxysilane are removed at atmospheric pressure. The pressure is then reduced to 1–2 mm. and the desired 4-chloro-3-(trifluoromethyl)phenyldimethylethoxysilane distills off at 65°–67° C. To 246 grams of this silane there was slowly added 200 cc. of 50% sulphuric acid, with vigorous stirring being employed during such addition and for two hours thereafter, and at the end of this time cracked ice was added. The organic layer was separated, washed free of acid, dried with anhydrous sodium sulfate and distilled. The bis-(4-chloro-3-(trifluoromethyl)phenyl)-tetramethyl disiloxane boiled at 130–136° C. at a pressure of 0.7 mm. of Hg.

One mole of the disiloxane of this example is admixed with one mole of hexamethylcyclotrisiloxane and equilibrated with 100% sulphuric acid for 36 hours at 25° C. The sulphuric acid is then permitted to separate and is decanted off. Thereafter, the silicone fluid is washed with water followed by washing with aqueous sodium bicarbonate solution. The silicone fluid is then vacuum distilled at 200° C. at 2 mm. in order to remove low boiling components. The resulting fluid has the following average structural formula:

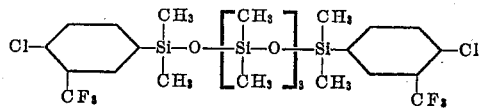

The freezing point of this silicone was below —90° F.

EXAMPLE IV

Into a reaction vessel provided with a stirrer and cooling means there was introduced 90 parts by weight of hexamethylcyclotrisiloxane and 10 parts by weight of bis-p-chlorophenyltetramethyl disiloxane. After thorough admixing, an equal volume of 90% sulphuric acid was added slowly, the vessel being cooled during the addition, and the entire mixture stirred for 25 minutes. The mixture was poured onto a large excess of chopped ice. The only silicone layer which separated was then washed with water and aqueous sodium bicarbonate, and freed from volatiles. The resulting purified silicone oil had a viscosity of 800 centistokes at 100° F. and 338 centistokes at 210° F., the viscosity temperature coefficient being 0.577. Its freezing point was below —65° C.

The low freezing point lubricants may be prepared by following the process of Example IV by substituting an equal molar proportion of (1) bis-p-bromophenyltetramethyl disiloxane and (2) bis-p-fluorophenyltetramethyl disiloxane for the bis-p-chlorophenyltetramethyl disiloxane of Example IV. In both of these instances excellent lubricants having freezing points considerably below —65° C. will result.

A jet engine was lubricated with several gallons of the silicone fluid of Example I. The jet engine was put into operation for several hours and the fluid was found to lubricate the ball and roller bearings, accessory transmissions, gears and hydraulic pump components satisfactorily. The jet engine was then stopped and the bearings were allowed to become heated as customarily takes place so that the bearing temperatures reached values of well above 400° F. The bearing temperatures eventually dropped by dissipation of the heat to the ambient atmosphere. The lubricant was withdrawn from the jet engine and examined. It was found to be completely clean and showed no evidence whatever of decomposition or pyrolysis of the silicone such as normally takes place therein with all previously used organic lubricants including petroleum oils, synthetic diesters and the like.

It will be appreciated that the silicone lubricants of this invention may comprise mixtures of two or more different silicone fluids as disclosed herein. Furthermore, small amounts of other silicones such as dimethyl silicones, or additives to impart corrosion resistance, film strength, adhesion to metals, and the like, and solid lubricants such as molybdenum disulfide may be included.

It will be understood that the above detailed description and examples are only illustrative and not in limitation of the invention.

I claim as my invention:
1. A fluid silicone lubricant consisting essentially of

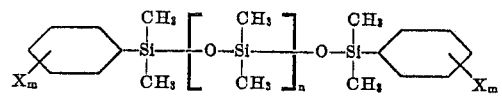

where $n$ is at least 1, X represents at least one of the group consisting of chlorine, bromine, fluorine, and trifluoromethyl and $m$ has a value of from 1 to 4.

2. The fluid silicone of claim 1, wherein $n$ has a value of from 3 to 6.

3. A fluid silicone lubricant consisting essentially of

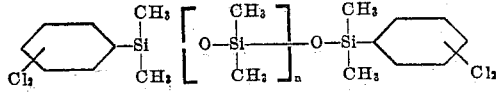

where $n$ is at least one.

4. The silicone lubricant of claim 3, wherein $n$ is from 3 to 6.

5. A fluid silicone lubricant consisting essentially of

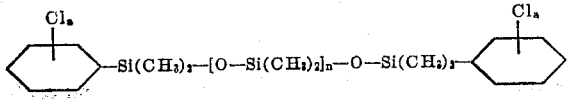

wherein $n$ has a value of at least 1 and $a$ is an integer from 1–4, inclusive.

References Cited in the file of this patent

UNITED STATES PATENTS

| | | |
|---|---|---|
| 2,258,219 | Rochow | Oct. 7, 1941 |
| 2,571,090 | Kohl | Oct. 16, 1951 |
| 2,599,984 | Fletcher | June 10, 1952 |
| 2,640,066 | Kohl | May 26, 1953 |

FOREIGN PATENTS

| | | |
|---|---|---|
| 502,052 | Belgium | Apr. 14, 1951 |
| 655,105 | Great Britain | July 11, 1951 |